(12) United States Patent
Yuan

(10) Patent No.: US 7,027,154 B2
(45) Date of Patent: Apr. 11, 2006

(54) POLARIZATION CONDITIONER PACKAGING AND COLLIMATOR ALIGNMENT MECHANISM

(75) Inventor: Bin Yuan, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 384 days.

(21) Appl. No.: 10/692,956

(22) Filed: Oct. 24, 2003

(65) Prior Publication Data

US 2005/0088651 A1 Apr. 28, 2005

(51) Int. Cl.
*G01B 11/00* (2006.01)
(52) U.S. Cl. ....................................................... 356/399
(58) Field of Classification Search ................ 356/124, 356/399–401
See application file for complete search history.

(56) References Cited

U.S. PATENT DOCUMENTS

| 4,805,976 | A | | 2/1989 | Wilkening et al. |
| 5,136,433 | A | | 8/1992 | Durell |
| 5,416,332 | A | | 5/1995 | Chen et al. |
| 5,771,270 | A | | 6/1998 | Archer |
| 6,108,355 | A | * | 8/2000 | Zorabedian ................... 372/20 |
| 6,266,130 | B1 | * | 7/2001 | Hasegawa et al. ............. 355/53 |
| 6,486,942 | B1 | * | 11/2002 | Colbourne et al. ......... 356/124 |
| 6,553,161 | B1 | | 4/2003 | Upton |
| 6,597,483 | B1 | | 7/2003 | Oguma |
| 6,597,829 | B1 | * | 7/2003 | Cormack ...................... 385/22 |

OTHER PUBLICATIONS

Patent Abstracts Of Japan, vol. 1998, No. 02, Jan. 30, 1998 & JP 09 274160 A (Mitsubishi Chem Corp), Oct. 21, 1997, *abstract*.
Patent Abstracts Of Japan, vol. 1997, No. 07, Jul. 31, 1997 & JP 57 010105 A (Fuji Electrochem Co Ltd), Mar. 7, 1997, *abstract*.
Patent Abstracts Of Japan, vol. 006, No. 070 (P-113), May 6, 1982 & JP 57 010105 A Matsushita Electric Ind Co Ltd), Jan. 19, 1982, * abstract*.
Patent Abstracts Of Japan, vol. 2000, No. 21, 33 Aug. 2001 & JP 2001 116957 A (Minolta Co Ltd), Apr. 27, 2001, *abstract*.
Copy of European Search Report dated: Jan. 21, 2005.

* cited by examiner

*Primary Examiner*—Gregory J. Toatley, Jr.
*Assistant Examiner*—Isiaka O. Akanbi

(57) ABSTRACT

A polarization conditioner for aligning a collimator to provide a polarized light signal. The apparatus includes input and output collimators. An adjustment mechanism can be used to adjust a position of the output collimator in order to align it for receiving one of the polarized light signals from the beam splitter through free space.

20 Claims, 5 Drawing Sheets

POLARIZATION CONDITIONER PACKAGING AND COLLIMATOR ALIGNMENT MECHANISM

FIELD OF THE INVENTION

The present invention relates to an apparatus and method for aligning a collimator in, for example, a small and inexpensive package.

BACKGROUND OF THE INVENTION

Certain instrumentation or other devices require a polarized light beam. In order to generate the polarized beam, collimators can be used in packages that receive a light signal, polarize it, and output the polarized beam. However, these prior solutions tend to require expensive components and are physically large. For example, one such commercial product providing a prior solution has overall dimensions of 19"×18"×4" and costs three times as much as an embodiment of the solution described below. Therefore, a need exists, for example, for collimators in a small and in expensive package to provide polarized light signals.

SUMMARY OF THE INVENTION

A method and apparatus for aligning a collimator, in accordance with the invention, includes input and output collimators. The input collimator receives a light signal and provides it to a polarization mechanism, which polarizes the light signal. With the alignment mechanisms in accordance with the invention, five degrees of freedom alignment is provided.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Overview

Figure 1:
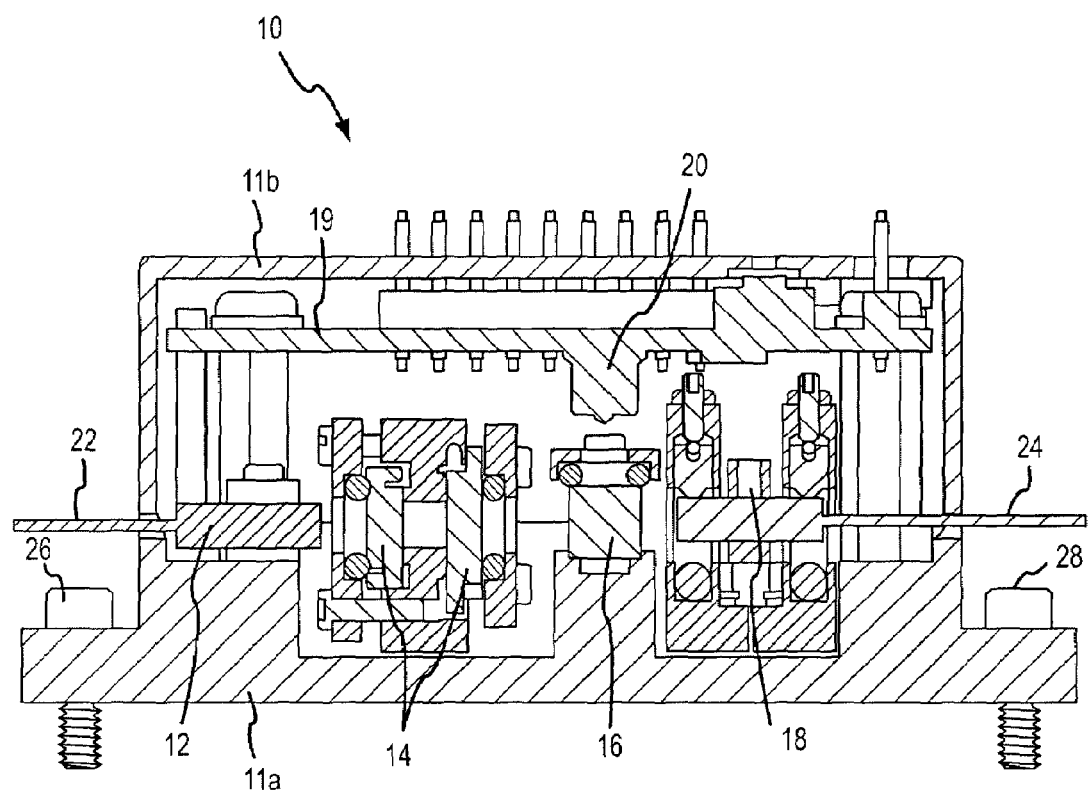
FIG. 1 is a cross-sectional view of the polarization conditioner that contains the collimator alignment mechanisms.

FIG. 1 is the cross-sectional view of the polarization conditioner 10, illustrating how the components are held in place in this exemplary embodiment. The polarization conditioner 10 includes an input collimator 12 for attachment to a fiber optic cable 22 in order to receive a light signal. Collimator 12 passes the light signal through a polarization mechanism, in this example wave plates 14, which polarize the light beam in the x-y directions. Alternatively, a polarization mechanism can be implemented with any components that can polarize a light signal. A beam splitter 16 splits the polarized light signal into two corresponding light signals, one provided to a photodetector 20 and the other to an output collimator 18. Photodetector 20 is electrically connected to a printed circuit board 19 having a circuit to analyze the polarized light signal, and such circuits are known in the art. The height of photo detector 20 on PCB 19 is controlled by four standoffs, aligned and mounted with screws on PCB. The polarization conditioner 10 includes a base 11a and a casing 11b, composed of aluminum for example, to house the components. Base 11a can include a plurality of fasteners, such as steel bolts 26 and 28, for mounting it in a particular application.

The following is the principle of the polarization conditioner. An input beam passes through wave plates 14 and reaches beam splitter 16. The beam's polarity is detected by detector 20, which sends signals to the microprocessor in the circuit of PCB 19, operating to apply optimized voltages on wave plates 14 so as to maximize the polarization. The polarized light signal then passes through free space between input collimator 12 and output collimator 18. Therefore, output collimator 18 must be adjusted in order to precisely align it for receiving the polarized light signal from free space. Output collimator 18 can output the polarized light signal, as a polarized beam, onto a fiber optic cable 24, a polarization maintaining fiber.

Figure 2:
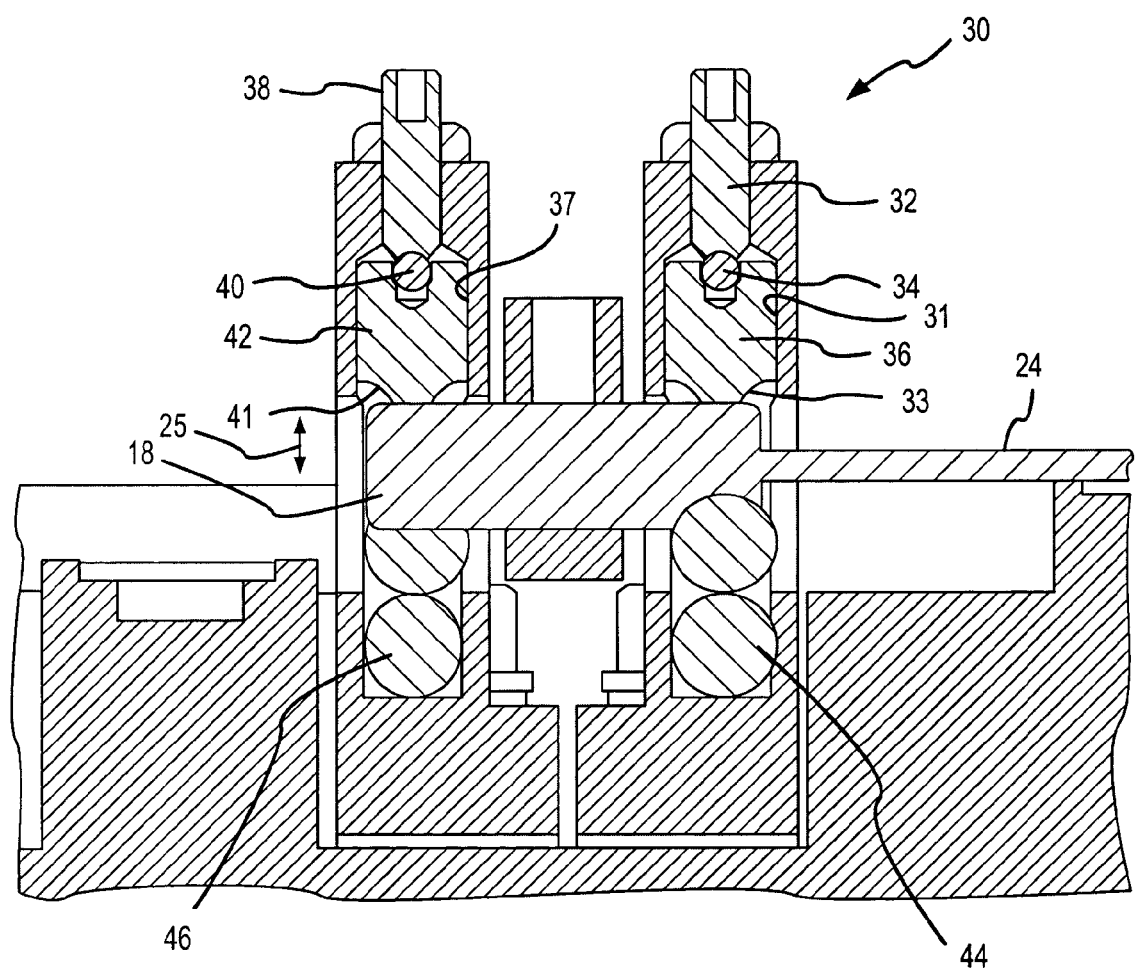
FIG. 2 is a side view of the collimator alignment device illustrating height adjustment and tilting in the vertical plane.

FIG. 2 illustrates a first adjustment mechanism 30 for collimator translation and tilting in a vertical plane. The output collimator 18, at its ends, sits on the stacked rubber segments 44 and 46, which provide reasonable resilient force to allow the output collimator 18 to be moved in a designed range in the vertical plane as represented by arrow 25. On top of the output collimator, a guided piston or plunger (36, 42) is pressed onto the output collimator 18 outer surface at each end as shown. A pair of set screws 32 and 38 can apply a force against pistons 36 and 42 via steel balls 34 and 40, respectively. The pistons and set screws can be composed of metal, for example, any other material providing sufficient durability to move the output collimator.

For vertical alignment operation, the set screws 32 and 38 are rotated to move the output collimator in a vertical direction 25. If the screws are rotated downward, they apply a force to the respective ends of output collimator 18 to move it downward. If the screws are rotated upward, the force of compressed rubber segments 44 and 46 forces output collimator 18 upward. If only one screw is adjusted, only tilting of the output collimator 18 occurs. If both screws 32 and 38 are adjusted, then both height changing and tilting of the output collimator can be accomplished. By using a #0-80 screw, for example, a resolution of 0.9 µm per degree rotation can be achieved.

Figure 3:
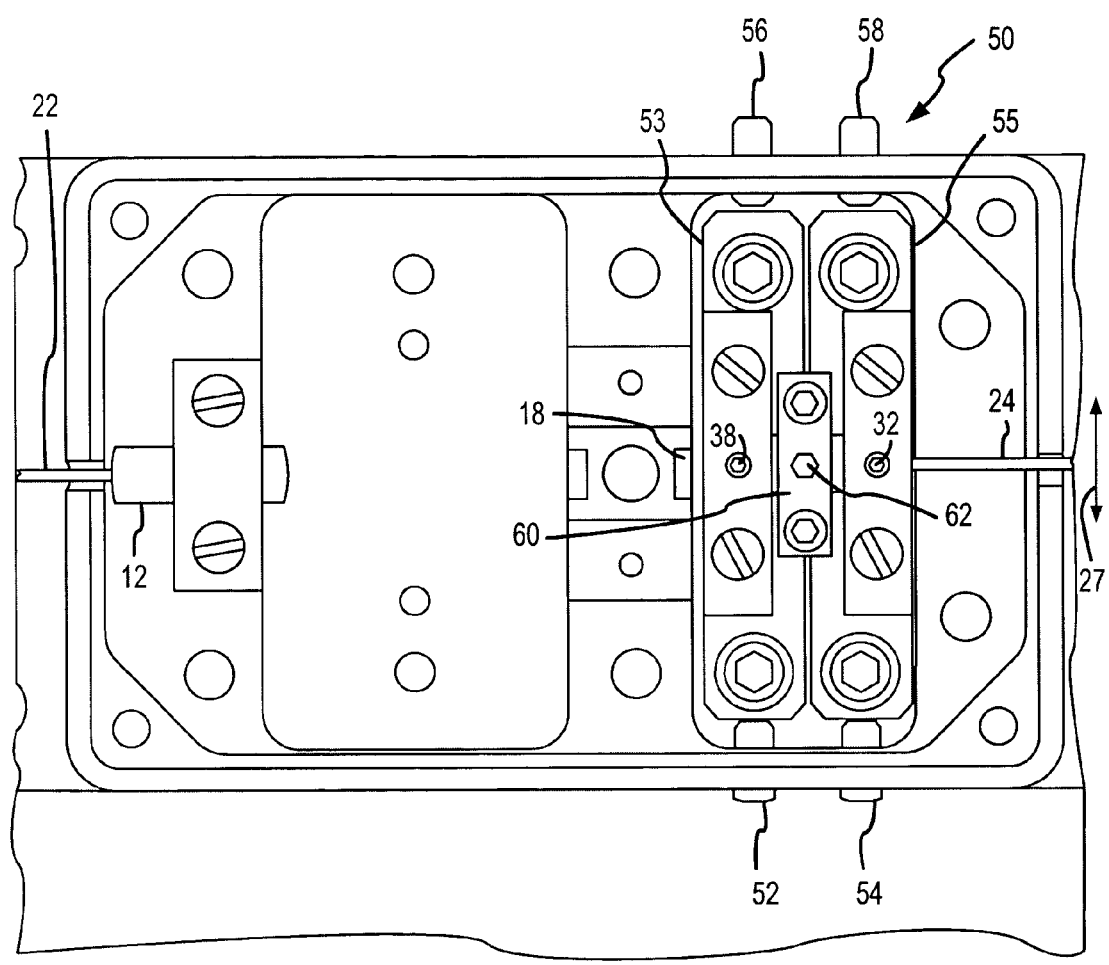
FIG. 3 is a top view of the collimator alignment device illustrating lateral adjustment and tilting in the horizontal plane.

FIG. 3 illustrates a second adjustment mechanism 50 for collimator translation and tilting in a horizontal plane as represented by arrow 27. As with the vertical adjustment, the lateral adjustment and tilting in a horizontal plane are performed by rotating horizontal set crews (52, 54, 56, 58) onto the sliding stands through the package walls. The sliding stands are bolted down with screws and spring washers to maintain the output collimator 18 and also allow it to slide. The second adjustment mechanism also includes pins and slots at the bottom of the stand that guide the sliding of the output collimator 18 in the horizontal plane. Rotation of the horizontal set screws (52, 54, 56, 58) causes horizontal movement of the mounting structures 53 and 55, which in turn causes horizontal movement of output collimator 18. The set screws and mounting structures can be composed of metal, for example, any other material providing sufficient durability to move the output collimator. For example, screws 52, 54, 56, and 58 can be implemented with 2-56 brass-tip set screws.

The polarization conditioner 10 can also include a rotational adjustment mechanism for rotational adjustment of the output collimator 18, as shown in FIG. 3. In this embodiment, the rotational adjustment mechanism includes a clamp 60 with a pinhole or aperture 62 tied onto it. Any rigid pin can be inserted pinhole 62 in order to rotate the output collimator, via frictional force, as needed.

The first, second, and rotational adjustment mechanisms described above are one example of how these mechanisms can be implemented. Alternatively, first, second, and rotational adjustment mechanisms can be implemented with any structures that provide for sufficient translation and tilting of the output collimator in horizontal and vertical planes in order to align for receiving the polarized light signal from free space.

Figure 4:
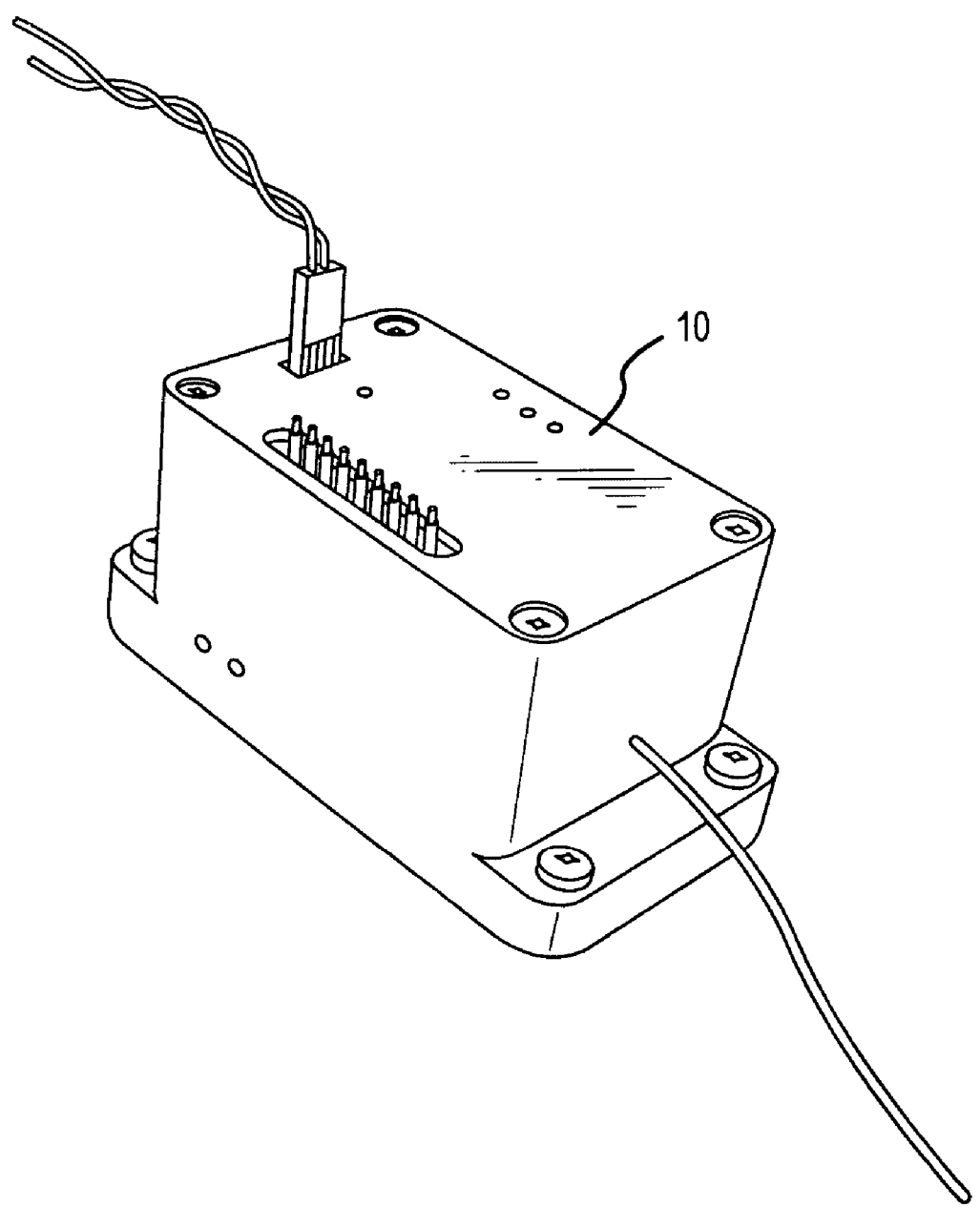
FIG. 4 is a perspective view of a polarization conditioner package containing the collimator alignment mechanisms.
Figure 5:
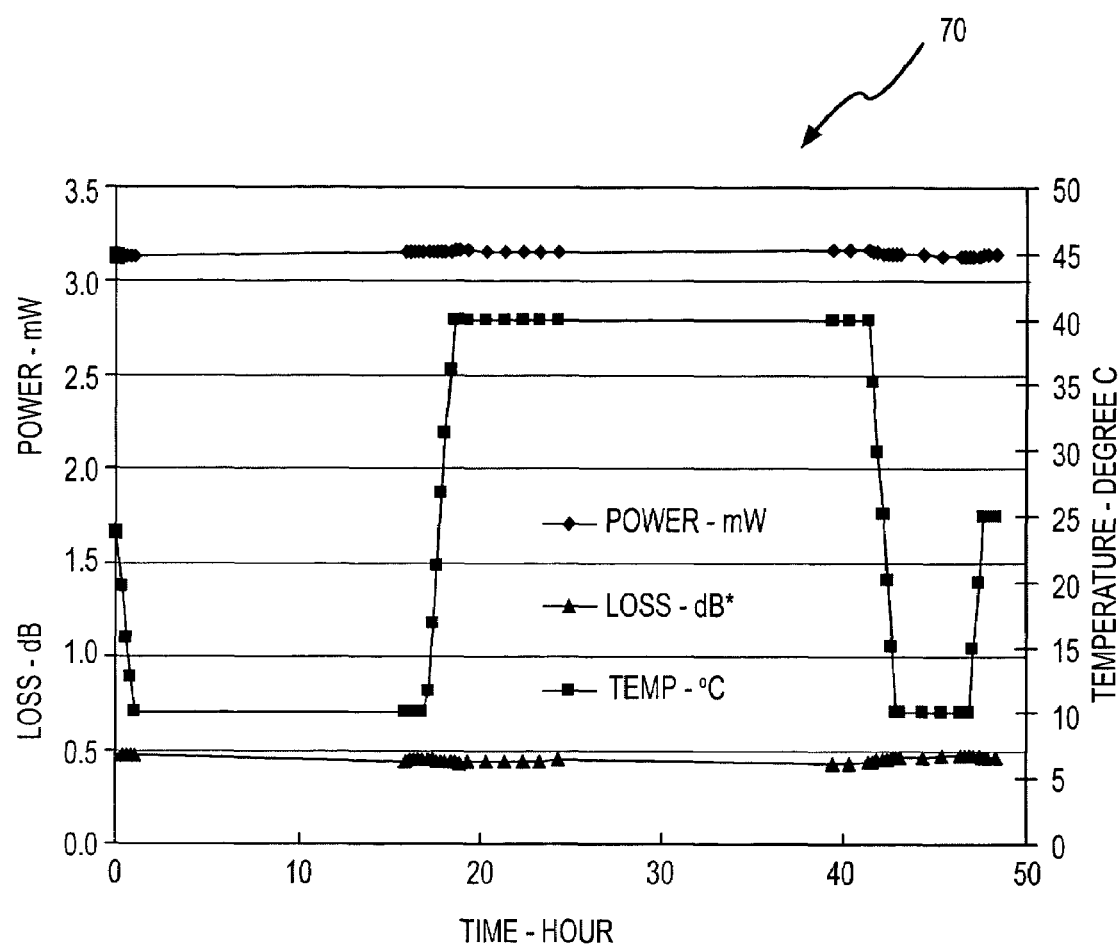
FIG. 5 is a graph of thermal test results for the polarization conditioner with the collimator alignment mechanisms.

FIG. 4 is perspective view of the polarization conditioner 10 within casing 11*b*, illustrating the complete package. FIG. 5 is a graph of thermal test results 70 of an implementation of an exemplary embodiment that shows the stable performance within the storage temperature range.

The following provides examples of mounting and alignment strategies for an embodiment in accordance with the invention shown in FIGS. 1–4. All front-end elements can be "dropped" (positioned) and clamped into place through passive alignment. Only the output collimator needs to be actively aligned in this embodiment. Elastomer O-rings can be used for soft contact on fragile optical elements such as the wave plates 14 and beam splitter 16. The two wave plates are mounted on one holder for less alignment errors. The base 11*a* can include all alignment references.

The following identifies features of this exemplary design. The output collimator alignment mechanism provides for five (out of total six) degrees-of-freedom alignment mechanism, including three tilts and two translations, except the translation in an axial direction. Very high precision is needed in angular alignment, approximately one arc minute accuracy, and large adjustment range, +/−0.6 mm. This design supports an adjustment at two ends of the output collimator 18. If only one end moves, the adjustment mechanism generates tilting. If both ends move, the adjustment mechanism generates translation in the horizontal or vertical planes. The height adjustment and tilting are performed by turning the set screws and applying motion to the output collimator through the single-ball bearing and piston inserts. Lateral translation and tilting are performed by laterally moving the rear stands (53 and/or 55) using set screws (52, 54, 56, 58). The narrow edge contacts of piston inserts (33, 41) on the output collimator provide for reducing coupled motion when one end moves up or down. The piston inserts are also used to guide loading and to reduce coupled motion when one end of the output collimator moves from left to right. A single-ball bearing is used to reduce friction and its force applied to the piston insert and then the collimator, which may cause unnecessary tilting to the collimator. Finally, the rotational alignment or adjustment is performed with the rotating central clamp 18.

The polarization conditioner 10 can include certain measures to reduce the side effects or coupling related problems at alignment adjusting. These measures include, for example, a steel balls 34 and 40 between the set screws (32, 38) and the pistons (36, 42) as a torque remover; the narrowed contact area at the piston tips (33, 41) against the output collimator 18 to avoid its whole body motion; a tight fit between the piston tips (33, 41) and the output collimator 18 outer surface; a small clearance between the pistons (36, 42) outer diameter and the fitting holes (31, 37); and a reasonable clearance between the output collimator 18 outer diameter and vertical slots of the sliding stands.

One problem solved by the exemplary embodiment described above is to align collimators, for example, with five degrees-of-freedom in a small package. Therefore, certain advantages of embodiments in accordance with the invention include, for example, five degree-of-freedom alignment capability, large adjustment range (±1° angular and ±600 μm translational), small size package (with overall dimensions of 72 mm×35 mm×31 mm), use of low cost components, and built-in aligning mechanisms that allow easy re-work. Accordingly, an embodiment in accordance with the present invention is a polarization conditioner in a small size physical package, light in weight, low cost in manufacturing, and reliable in performance.

While embodiments in accordance with the invention have been described, it will be understood that many modifications will be readily apparent to those skilled in the art, and this application is intended to cover any adaptations or variations thereof. For example, various types of mechanical structures and packaging for them may be used without departing from the scope of the invention. This invention should be limited only by the claims and equivalents thereof.

The invention claimed is:

1. An apparatus for aligning a collimator, comprising:
   an input collimator for receiving a light signal;
   a polarization mechanism, located proximate the input collimator, for receiving and polarizing the light signal;
   an output collimator; and
   an adjustment mechanism for adjusting a position of the output collimator in order to align the output collimator for receiving the polarized light signal from the polarization mechanism, wherein the adjustment mechanism provides for five degrees of freedom in aligning the output collimator.

2. The apparatus of claim 1 wherein the polarization mechanism includes a pair of wave plates.

3. The apparatus of claim 1 wherein the first adjustment mechanism includes a pair of set screws physically coupled to the output collimator in the vertical plane.

4. The apparatus of claim 1 wherein the second adjustment mechanism includes a pair of set screws physically coupled to the output collimator in the horizontal plane.

5. The apparatus of claim 1, further including a compressible member located beneath the output collimator.

6. The apparatus of claim 1, further comprising a beam splitter, located between the polarization mechanism and the output collimator, for splitting the polarized light signal into two polarized light signals.

7. The apparatus of claim 6, further comprising:
   a photodiode positioned to receive one of the polarized light signals; and
   a circuit, coupled to the photodiode, for electrical processing of the one polarized light signal.

8. The apparatus of claim 1 wherein the adjustment mechanism includes:
   a first adjustment mechanism for providing translation and tilting movement of the output collimator in a vertical plane of the apparatus;
   a second adjustment mechanism for providing translation and tilting movement of the output collimator in a horizontal plane of the apparatus; and
   a rotational adjustment mechanism for use in rotating the output collimator.

9. The apparatus of claim 1 wherein the apparatus is contained within a package having overall dimensions equal to or less than 72 mm×35 mm×31 mm.

10. A method for aligning a collimator, comprising:
receiving a light signal via an input collimator;
polarizing the light signal;
receiving the polarized light signal via an output collimator; and
adjusting a position of the output collimator in order to align the output collimator for receiving the polarized light signal, wherein the adjusting step provides for five degrees of freedom in aligning the output collimator.

11. The method of claim 10 wherein the polarizing step includes passing the light signal through a pair of wave plates.

12. The method of claim 10 wherein the providing the first translation step includes providing a pair of set screws physically coupled to the output collimator in a vertical plane of the output collimator.

13. The method of claim 10 wherein the providing the second translation step includes providing a pair of set screws physically coupled to the output collimator in a horizontal plane of the output collimator.

14. The method of claim 10, further providing a compressible member located beneath the output collimator.

15. The method of claim 10, further comprising splitting the polarized light signal into two polarized light signals.

16. The method of claim 15, further comprising:
receiving one of the polarized light signals; and
transmitting the one polarized light signal to a circuit for analysis.

17. The method of claim 10 wherein the adjusting step includes:
providing a first translation and tilting movement of the output collimator in a vertical plane;
providing a second translation and tilting movement of the output collimator in a horizontal plane; and
rotating the output collimator.

18. An apparatus for aligning a collimator, comprising:
an input collimator for receiving a light signal;
a polarization mechanism, located proximate the input collimator, for receiving and polarizing the light signal;
an output collimator;
a beam splitter, located between the polarization mechanism and the output collimator, for splitting the polarized light signal into two polarized light signals; and
an adjustment mechanism for adjusting a position of the output collimator in order to align the output collimator for receiving one of the polarized light signals from the beam splitter, the adjustment mechanism including:
a first adjustment mechanism for providing translation and tilting movement of the output collimator in a vertical plane of the apparatus;
a second adjustment mechanism for providing translation and tilting movement of the output collimator in a horizontal plane of the apparatus; and
a rotational adjustment mechanism for use in rotating the output collimator,
wherein the first adjustment mechanism, the second adjustment mechanism, and the rotational adjustment mechanism together provide for five degrees of freedom in aligning the output collimator.

19. The apparatus of claim 18 wherein:
the first adjustment mechanism includes a pair of set screws physically coupled to the output collimator in the vertical plane;
the second adjustment mechanism includes a pair of set screws physically coupled to the output collimator in the horizontal plane; and
the rotational adjustment mechanism includes an aperture in a rotational clamp positioned around the output collimator and configured to accommodate a pin for rotating the output collimator.

20. The apparatus of claim 18 wherein the apparatus is contained within a package having overall dimensions equal to or less than 72 mm×35 mm×31 mm.

* * * * *